United States Patent [19]
Dudley

[11] 3,820,789
[45] June 28, 1974

[54] COLOR CODED POCKETED TARGET PROJECTILES AND SCORING INDICIA

[76] Inventor: Juliette T. Dudley, 724 First St., Apt. 6, San Pedro, Calif. 90731

[22] Filed: Oct. 17, 1972

[21] Appl. No.: 298,399

[52] U.S. Cl. ............ 273/95 R, 35/31 R, 273/105 R
[51] Int. Cl. ............................................. A63b 71/02
[58] Field of Search ............ 273/95 R, 105 R, 95 D, 273/102.16, 127 R, 127 B; 35/31, 70 R

[56] References Cited
UNITED STATES PATENTS

| | | | |
|---|---|---|---|
| 921,366 | 5/1909 | Conolly | 273/105 R |
| 1,996,986 | 4/1935 | Weinberg | 273/105 R |
| 2,201,865 | 5/1940 | Kriekard | 273/105 R |
| 2,926,915 | 3/1960 | Johns | 273/95 R |
| 3,357,116 | 12/1967 | Bazacos | 35/31 F |
| 3,406,973 | 10/1968 | Poole | 273/127 B |

Primary Examiner—Richard C. Pinkham
Assistant Examiner—Marvin Siskind
Attorney, Agent, or Firm—Richard F. Carr

[57] ABSTRACT

An educational game device including a plurality of discrete target elements of different colors, each having an opening leading to a receptacle, a plurality of sets of balls adapted to enter the openings in the target elements, the sets of balls being of colors corresponding to those of the target elements, and a plurality of sets of objects contoured to the shapes of arabic numbers, the sets of numbers being of colors corresponding to those of the target elements and sets of balls.

3 Claims, 9 Drawing Figures

PATENTED JUN 28 1974 3,820,789
SHEET 1 OF 2
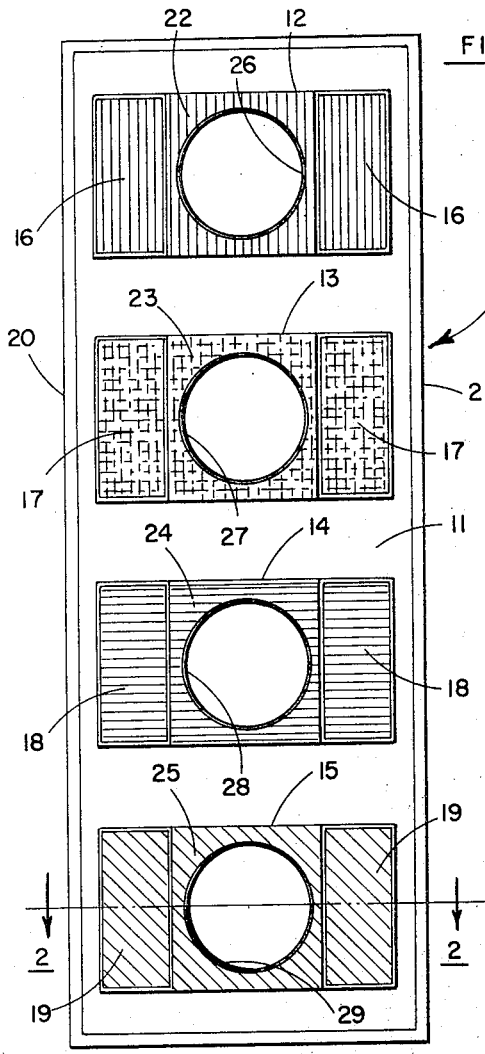
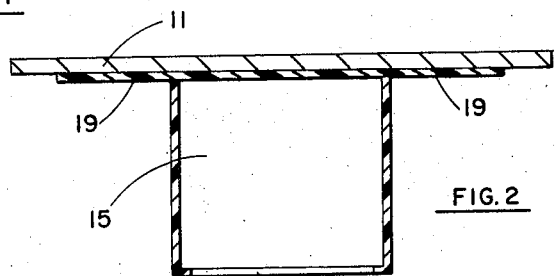
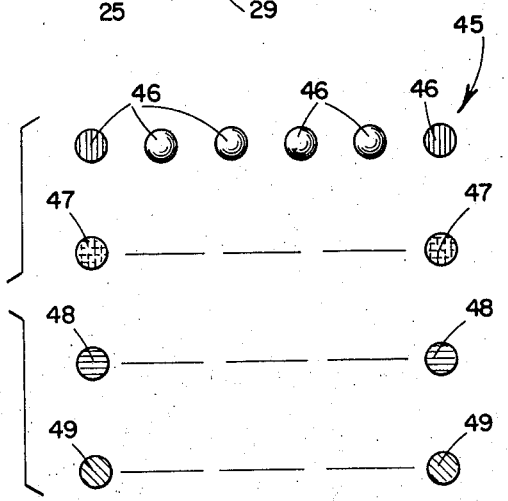
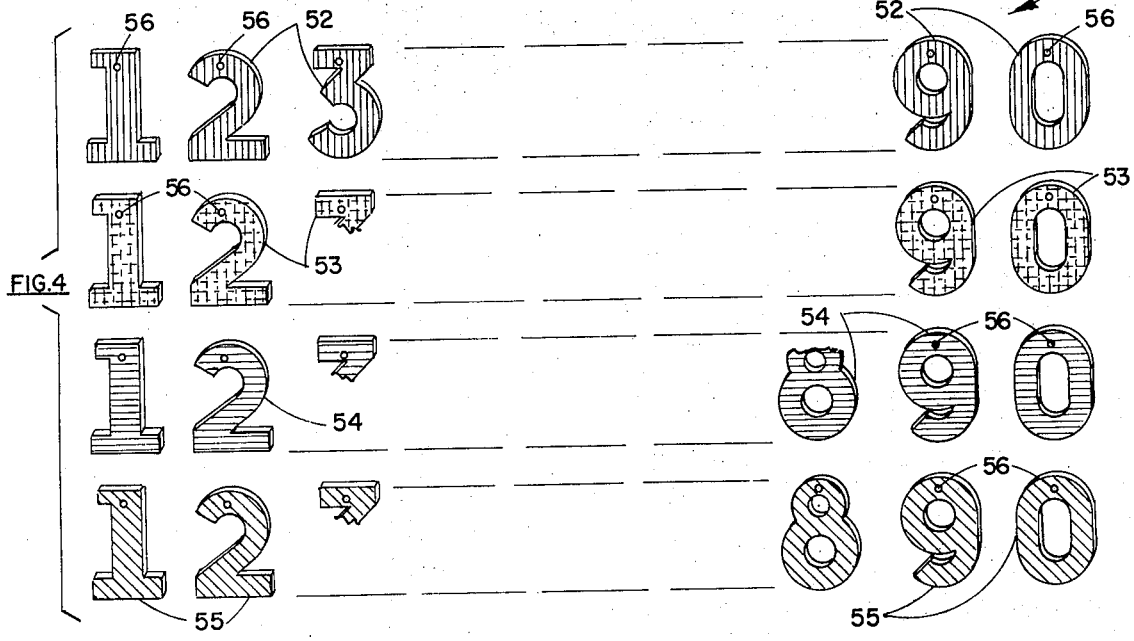

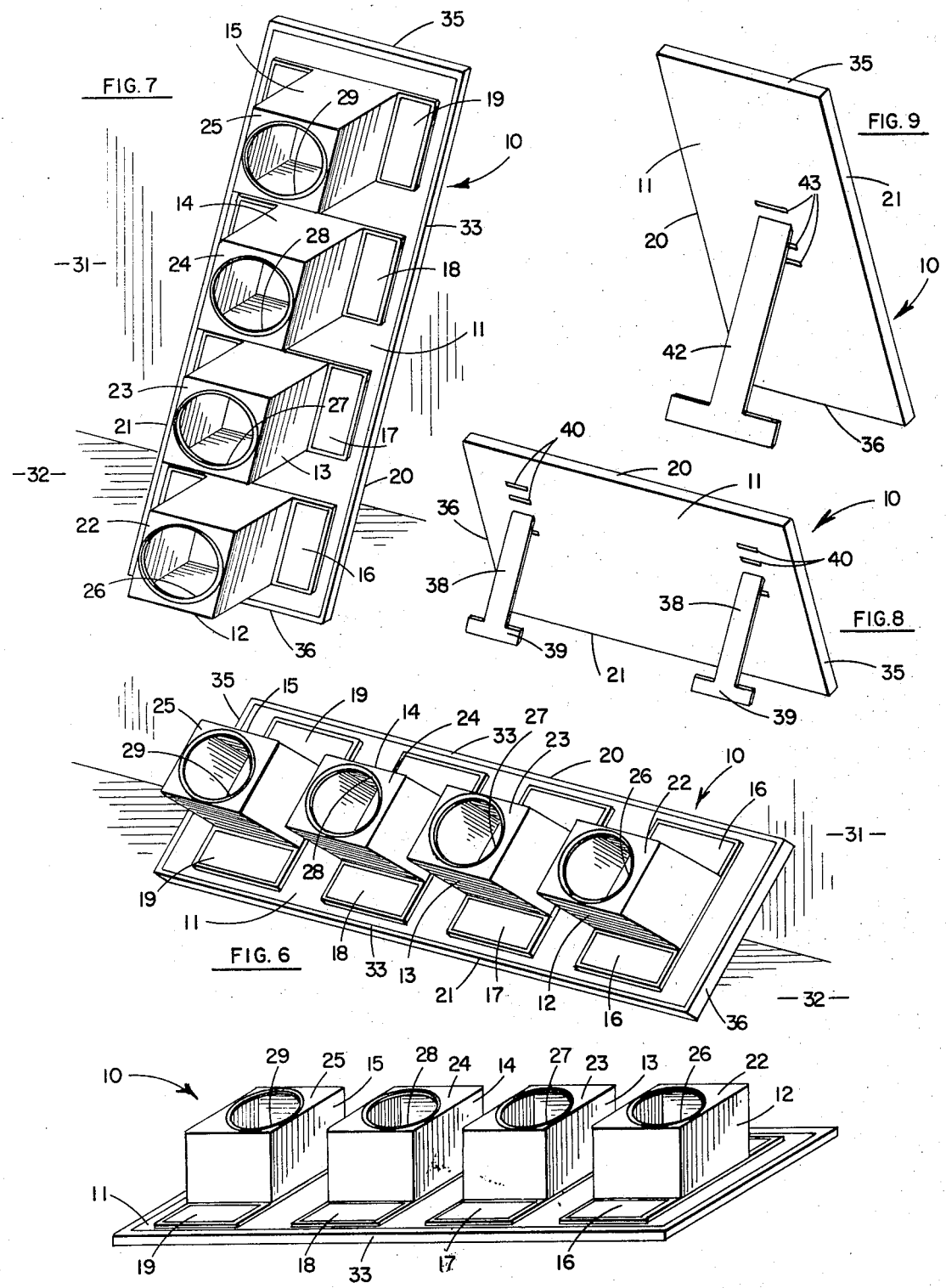

COLOR CODED POCKETED TARGET PROJECTILES AND SCORING INDICIA

BACKGROUND OF THE INVENTION

1. Field of the Invention

This invention relates to educational games.

2. Description of Prior Art

In teaching small children, there exists a need for making the subjects interesting and keeping the attention of the pupils. This objective can be advanced if some of the teaching can involve games which are amusing as well as educational. However, most games do not accomplish such objectives, being unsuitable for teaching combined physical and mental skills for the children. Conventional games not intended for educational purposes may possibly help develop some physical skills, but have little further function in developing the abilities of the child.

Examples of game devices in the prior art are as follows: U.S. Pat. Nos. 1,535,118, 1604,593, 1,918,094, 1,996,986, 2,534,730, 2,672,345, 3,051,488 and 3,208,751.

SUMMARY OF THE INVENTION

The present invention provides an improved educational game which can be used to develop a number of different skills of the children playing it. The game is versatile and can be played in different ways and by children of various ages.

The game device includes a target unit which is provided with individual target elements which are made of different colors. Typically, these will be red, yellow, blue and green. Each target element is in the form of a receptacle having a circular opening of sufficient size to admit a ball and also permit a child to reach in and retrieve the balls which have entered. The target unit can be positioned flat on a horizontal surface or may be propped up in a generally vertical manner to vary the way in which the game is used. In addition to the target unit, there are sets of balls of colors corresponding to those of the target elements. Thus, when the target elements are red, yellow, blue and green, there are sets of balls of those colors. In addition to this, there are sets of individual objects contoured in the shapes of numbers, also of the colors of the balls and receptacles.

In playing the game, a child may attempt to throw the balls into the receptacles of corresponding colors. Upon counting the balls in each receptacle, the child then may indicate his score by selecting numbers of appropriate colors to correspond to the number of balls which have entered the various target receptacles. In this way, the child develops physical skills in throwing and retrieving the balls, learns arithmetic in counting and selecting the numbers to indicate his score, can identify colors and match them by throwing the balls into the proper openings and choosing the numbers of the proper colors, and can learn and compare sizes and shapes in manipulating the balls with respect to the target unit. The game equipment may be made principally of plastic and is of durable nature. It may be used indoors or out and does not require a large area for its use. Moreover, the unit is of generally simple construction, permitting its manufacture at a low cost.

BRIEF DESCRIPTION OF THE DRAWING:

FIG. 1 is a top plan view of the target unit of the invention, with the components shaded for color;

FIG. 2 is a transverse sectional view taken along line 2—2 of FIG. 1;

FIG. 3 is an elevational view of the balls used with the game of this invention, showing these elements shaded for color;

FIG. 4 is a perspective view of the groups of numerals, shaded for color;

FIG. 5 is a perspective view of the target unit resting on a horizontal supporting surface;

FIG. 6 is a perspective view of the target unit as leaned against a vertical wall, with the individual target elements side by side;

FIG. 7 is a perspective view of the target unit leaned against the vertical wall, with the individual target elements positioned one above the other;

FIG. 8 is a perspective view of the target unit utilizing a means for positioning it in an upwardly inclined attitude, with the individual target elements side by side; and FIG. 9 is a perspective view of the target unit utilizing a different means for supporting it at an angle, with the individual elements one above the other.

DESCRIPTION OF THE PREFERRED EMBODIMENT

The educational game arrangement of the invention includes three principal components. One of these is a target unit 10, which includes an elongated flat base sheet 11 and a straight row of four spaced receptacles 12, 13, 14 and 15. These components suitably are made of plastic material. The base sheet 11 is rectangular in contour and provides the support for the receptacles 12, 13, 14 and 15 which are attached to it. The receptacles are in the form of boxes with rectangular walls, from the lower edges of which project side flanges 16, 17, 18 and 19 that project toward the longitudinal side edges 20 and 21 of the base sheet 11. The receptacle units 12, 13, 14 and 15 are of different colors, such as red, yellow, blue and green. In FIG. 1, the receptacles are shaded to represent these colors. Preferably, the base sheet 11 is white or some clearly contrasting color. In the upper walls 22, 23, 24 and 25 of the receptacles are large circular openings 26, 27, 28 and 29.

The target unit 10 may be positioned in various ways when the educational game is to be used. In the position shown in FIG. 5, the base sheet 11 merely rests on a horizontal supporting surface so that the receptacle units 12, 13, 14 and 15 project vertically upwardly. Also, the device may be leaned against a vertical wall, as shown in FIG. 6. Here, one of the longitudinal edges 20 of the base sheet rests against a vertical wall 31, while the opposite longitudinal edge 21 bears against the floor or other supporting surface 32. Rubber edging 33 may be included on the periphery of the base sheet 11 to increase the friction and improve stability when the device is leaned against a wall. In this attitude, the receptacle units 12, 13, 14 and 15 are arranged in a horizontal row, but are at an angle relative to both the floor and the wall.

In another position, illustrated in FIG. 7, the device may lean against the vertical wall 31 in the other direction. In other words, the longitudinal dimension of the base sheet 11 may extend upwardly, rather than horizontally. In this location, one of the transverse edges 35 engages the vertical wall 31, while the opposite transverse edge 36 rests upon the floor 32. This positions the receptacle units one above the other.

When a vertical wall is not available, the unit 10 may be propped up horizontally by means of a pair of T-shaped supports 38, as seen in FIG. 8. These supports may include rubber surfacing on their lower crossbars 39 to improve friction. The upper ends of supports 38 fit within a selected one of a series of longitudinal recesses 40 adjacent either end of the reverse side of the support sheet 11. By selecting the appropriate recess 40, the unit may be propped up at a desired angle.

The unit 10 also may be propped in an upstanding position, as shown in FIG. 9, by means of a similar but longer T-shaped supporting member 42. The latter element can fit in any one of several slots 43 arranged transversely of the support sheet 11.

A second principal element of the game of this invention is a group of spherical balls 45, such as illustrated in FIG. 3. The balls are of foam rubber or other soft material and have a diameter substantially less than that of the openings 26, 27, 28 and 29. The balls are in groups 46, 47, 48 and 49, having colors corresponding to those of the receptacle units 12, 13, 14 and 15, respectively. There are several balls, normally around 12, in each group. Thus, the balls in the group 46 are red, those in the group 47 are yellow, the group 48 is made up of balls that are blue, and those that are in group 49 are green. The various balls are to be thrown at the target unit to enter selected openings 26, 27, 28 and 29 as the game is in use.

The third principal component is a group of large numerals 51, as illustrated in FIG. 4. The numerals 51 are in groups 52, 53, 54 and 55, again corresponding in color to the colors of the receptacle units 12, 13, 14 and 15. That is to say, the numbers in the groups 52, 53, 54 and 55 are red, yellow, blue and green, respectively. The numbers are made up of individual members of suitable material, such as plastic, and preferably include the arabic numbers zero through nine. Openings 56 may be provided near the upper portions of these numerals, allowing them to be hung on hooks if desired.

In using the educational game of this invention, the target unit 10 is placed flat on a horizontal supporting surface, as shown in FIG. 5, or it is inclined upwardly in the manner illustrated in FIG. 6 or FIG. 7, either by being leaned against a wall or otherwise supported. The child then attempts to throw the balls 45 through the openings in the receptacles of the target unit 10. Typically, the child will be asked to throw the balls into the receptacles of matching colors. In other words, the red balls 46 would be directed toward the opening 26 of the red receptacle 12. Similarly, the yellow balls 47 would be cast toward the opening 27 of the yellow receptacle 13. The same holds true for the blue and green balls 48 and 49 and their receptacles 14 and 15, respectively. After completing this exercise, the child then can count the number of balls which have entered each receptacle and select a number of appropriate color to indicate his score in each instance. Thus, if three red balls 46 have entered the red receptacle 12, the child will select the red numeral three from the groups of numbers 52. The scores for the receptacles of other colors will be similarly identified by the numbers of corresponding color. The openings 26, 27, 28 and 29 are sufficiently large to allow the child to reach into the receptacles and take the balls out.

In this type of exercise, a small child not only is entertained, but may learn many things. Obviously, motor skills are practiced in the throwing of the balls toward the target unit. Muscles, including the small muscles, are developed in holding and manipulating the balls, while retrieving those that have missed exercises the entire body. The child also learns to identify colors and acquires the ability to match colors through the corresponding colors of the receptacles, balls and numbers. Numbers and counting are learned in ascertaining the number of balls which entered receptacles and then selecting the correct numeral to identify the score. Shapes and sizes also are learned. The child can identify the round openings in the receptacle units, the basic rectangular shapes of the walls of the receptacles, the spherical nature of the balls, etc. Also, size comparisons are possible as the child knows that the smaller balls can enter the larger receptacle openings. Even language can be improved through the communication with the other children and a teacher relative to the game.

The game is quite versatile and can be played both indoors and out. It is of durable nature and generally indestructible, even by small children. It permits variety, such as positioning the target unit 10 in different attitudes, as discussed above. Also, the game may be made to suit children of different ages, as the target can be made more difficult to hit by requiring the child to throw from a longer distance. Other variations in the way in which the game is used may be devised.

The foregoing detailed description is to be clearly understood as given by way of illustration and example only, the spirit and scope of this invention being limited solely by the appended claims.

I claim:

1. An educational game device comprising
a plurality of target elements, each of said target elements having an opening, said target elements being of different colors, each of said target elements including a receptacle for retaining a ball passing through the opening thereof,
   each of said receptacles being a box defined by substantially rectangular walls, each of said boxes including an outer wall, said openings being circular and in said outer walls,
   there being more than two of said boxes with said boxes being in a spaced relationship in a single row,
means for positioning said receptacles both horizontally and inclining upwardly,
a plurality of balls of smaller lateral dimensions than the lateral dimensions of said openings,
   whereby said balls are adapted to pass through said openings,
   said balls having colors corresponding to said colors of said target elements, there being a plurality of balls of each of said colors, and more balls of each color than receptacles of the corresponding color,
and a plurality of sets of a plurality of objects contoured to the shapes of arabic numerals, said arabic numerals in each of said sets including the numerals zero through nine, inclusive, said sets having colors corresponding to said colors of said target elements and said balls such that there is one of said sets in each of said colors.

2. A device as recited in claim 1 in which said means for positioning said receptacles includes a substantially flat sheet, said target elements being positioned in a row on said sheet.

3. A device as recited in claim 2 in which said means for positioning said receptacles includes a removable prop engageable with said substantially flat sheet.

* * * * *